June 9, 1959 L. J. BRANCATO ET AL 2,889,960
DEVICE FOR ALIGNING TUBULAR ARTICLES
Filed July 22, 1955 4 Sheets-Sheet 1
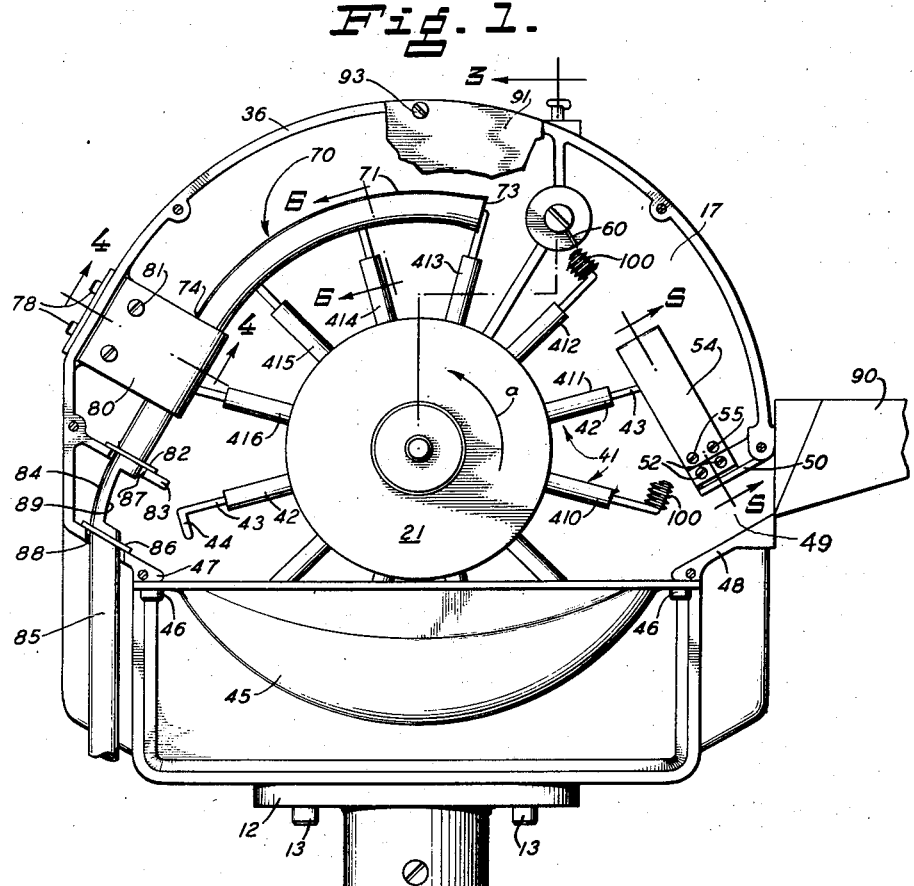
INVENTORS
LEO J. BRANCATO
JOSEPH P. MUENZEN
BY Walter S. Oleston
ATTORNEY.

June 9, 1959  L. J. BRANCATO ET AL  2,889,960
DEVICE FOR ALIGNING TUBULAR ARTICLES
Filed July 22, 1955  4 Sheets-Sheet 2
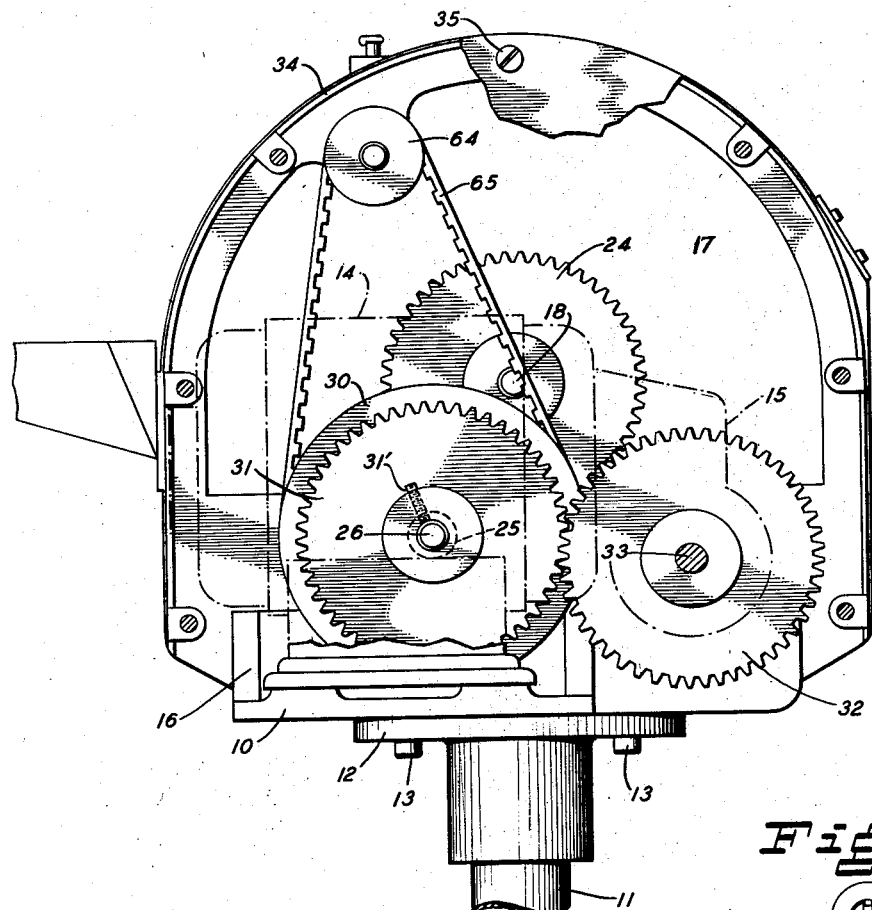
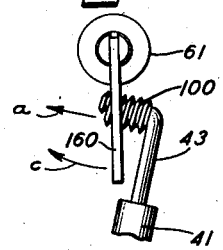
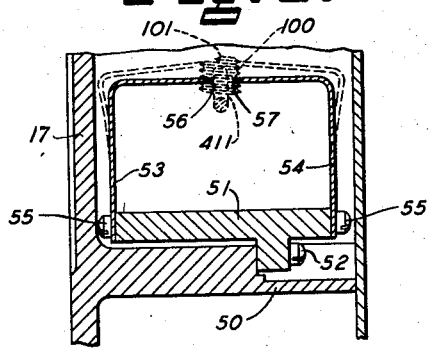
INVENTORS
LEO J. BRANCATO
JOSEPH P. MUENZEN
BY Walter S. Bleston
ATTORNEY

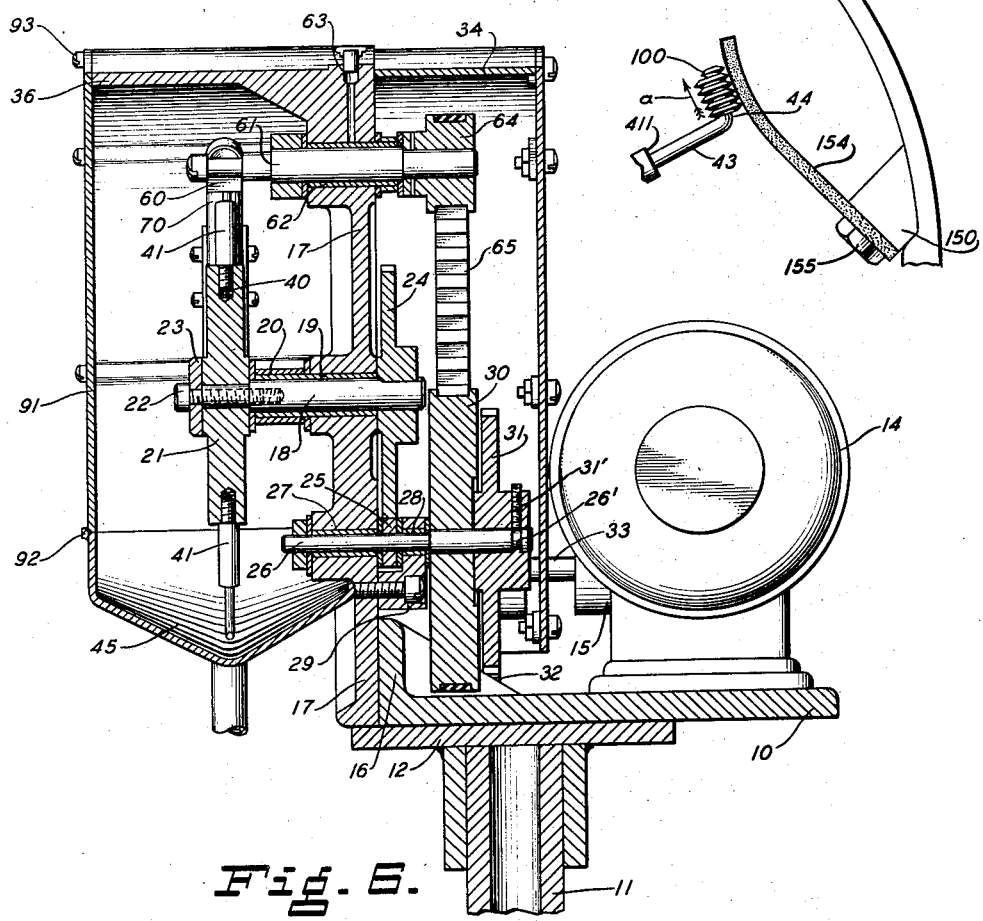

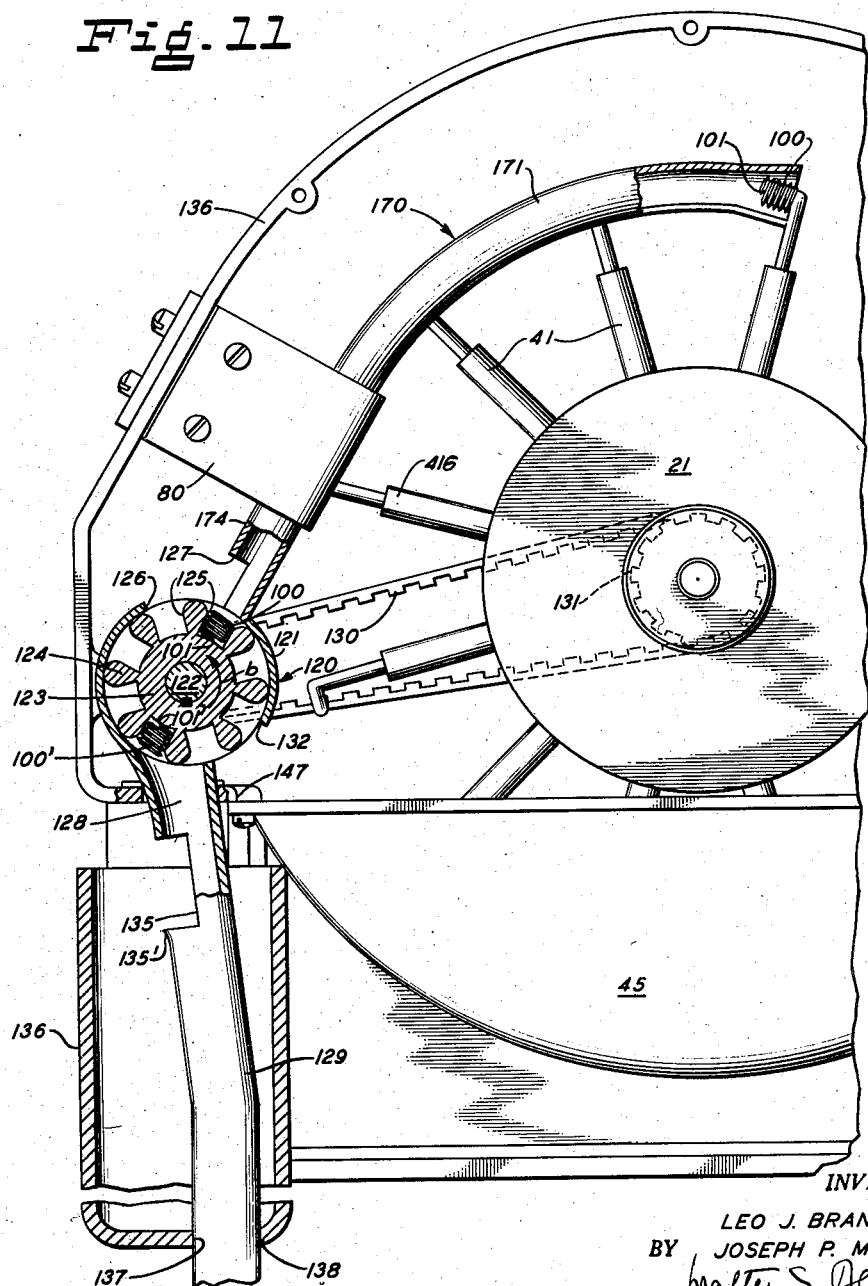

United States Patent Office 2,889,960
Patented June 9, 1959

2,889,960

DEVICE FOR ALIGNING TUBULAR ARTICLES

Leo J. Brancato, Danbury, Conn., and Joseph P. Muenzen, New Rochelle, N.Y., assignors to Heli-Coil Corporation, Danbury, Conn., a corporation of Delaware Application July 22, 1955, Serial No. 523,667

7 Claims. (Cl. 221—166)

The invention relates to a device or mechanism for picking up and aligning tubular articles or pieces of equal shape which are heaped irregularly with respect to one another in a trough, in order to permit the automatic feeding of such articles into machines, cartridges or other devices, e.g. for storing them in an orderly arrangement or for working them into a finished product. With respect to the applicability and operation of the device according to the invention, it is basically immaterial whether the tubular pieces have solid walls, as for instance, tubular sleeves for small bearings and bushings of suitable kinds or whether the pieces are flexible within certain limits as for instance cylindrical springs or screw-thread forming wire coil inserts. For this reason, the term "tubular pieces" occurring in the following description and claims, is to be understood to include such pieces with rigid walls as well as pieces with flexible walls. However, with respect to the last mentioned type of pieces, if they are wound of wire like the mentioned springs or inserts, it is to be considered that such pieces where heaped, tend to get entangled by the interengagement of the convolutions of the one coil with those of another coil.

Therefore, it is an object of the invention to provide a device for picking up tubular pieces from a storage trough and for disentangling and aligning the picked-up pieces.

In some instances, the tubular pieces here under consideration, have one of their ends so formed that the otherwise clear cross-section is obstructed e.g. by a closed bottom or by a diametrical tang or a polygonal end convolution as frequently existing as a grip end of a screw thread forming insert coil. Therefore, the invention further aims to provide a device of the mentioned type with means for orienting the tubular pieces in a certain direction, i.e. with the obstructed end leading in the conveying of the pieces. In addition, other means may be provided to reverse the direction of orientation in order to render it possible to feed the tubular pieces with the one or the other end leading as the machine or device which is to be charged with them may require.

The invention essentially consists of a rotatable wheel with a plurality of radial arms having their outer ends bent tangentially in the direction of the rotation of the wheel. A trough to receive therein a supply of tubular pieces is arranged so that the arms pass through it in the lower portion of their path and deliver picked up pieces to a chute through which the pieces can be conveyed to some extraneous device or machine.

Further objects and details of the invention will be apparent from the description given hereinafter and the accompanying drawing illustrating an embodiment thereof by way of example.

In the drawing:

Fig. 1 is a front elevation of a device according to the invention, a front cover plate being removed;

Fig. 2 is a rear elevation thereof, the driving motor being shown in dash lines;

Fig. 3 is a section along line 3—3 in Fig. 1;

Figs. 4, 5 and 6 are sections along lines 4—4, 5—5 and 6—6, respectively, of Fig. 1;

Fig. 7 is a perspective view of a tubular piece of the mentioned type;

Fig. 8 is a front view of a modified part;

Figs. 9 and 10 are a front view and a side elevation, respectively, of another modified part, and Fig. 11 is a front elevation partly in section of a modified device according to the invention.

Referring now to the drawing, the automatic feeding device is carried by a base plate 10 which in turn is supported by a pillar 11 and secured to a flange 12 thereof by screws 13. An electric motor 14 with a worm gear transmission of which the housing is visible at 15, is mounted on the base plate 10. This plate has an upright flange 16 to which the vertical frame plate 17 is secured by means not shown. In the frame plate, a main shaft 18 is journaled with the intermediary of a bearing sleeve 19 and spacer 20 holding a wheel 21 at the proper distance from the plate 17. Wheel 21 is keyed to the front end of the shaft 18 and secured to its by means of a screw 22 and washer 23. Further transmission means are provided between the mentioned worm gear transmission and the shaft 18. Such means may be of any suitable and conventional type, and may be of a fixed or a variable transmission ratio. However, it is advisable to provide an adjustable maximum torque in such transmission as a safety feature to prevent damage to the mechanism, should any movable part of its become jammed. Thus, in the illustrated embodiment there is a gear wheel 24 keyed to the shaft 18 on the rear side of the plate 17. The gear wheel 24 meshes with a small pinion 25 which is fixed to a shaft 26 having one bearing 27 in the frame plate and another bearing 28 in a small bracket 29 screwed to said plate. To the rear end of the shaft 26, a sprocket wheel 30 is keyed and a gear wheel 31 is connected to the shaft by a set screw 31' engaging a groove 26' in the shaft so that the transmissible torque is determined by the adjustment of the set screw 31'. Gear wheel 31 is in mesh with a gear 32 on the shaft 33 of the aforementioned worm gear transmission of the motor 14. The purpose of the sprocket wheel 30 will be explained later on. From the foregoing it will be clear that the wheel 21 can be rotated by the motor 14 via shaft 33, gear wheels 32 and 31, shaft 26, pinion 25, gear wheel 24, and shaft 18. A sheet metal flange 34 is secured to the frame plate at 35 to cover the mentioned driving members on the sides. Similarly, a flange 36 integral with the plate projects forward thereof to cover from the sides the wheel 21 and the parts which will now be described.

The wheel 21 is provided with a plurality of radial bores 40 into each of which a sprocket-like arm 41 is inserted which comprises a rod-like piece 42 extending from the wheel and a wire-like piece 43 projecting from piece 42 in the radial direction. The free end 44 of the piece 43 is bent at a right angle in the direction in which the wheel 21 rotates. In the illustrated embodiment there are twelve such arms but the number of arms may be selected as suited in each case. In order to identify an arm in a particular position, an index number, e.g. 2, is added to the reference numeral 41. Thus, "412" indicates one of the arms 41 in the position "2." It will be noted that the arms 41 may be readily removed from the wheel and other arms of different dimensions may be substituted, as the particular shape and size of the tubular pieces to be picked up by the device may require. Upon rotation of the wheel 21 in the direction of the arrow *a* in Fig. 1, the arms 41 move in the lower portion of their path through a trough 45, which is screwed at 46 to little brackets 47 and 48 and serves to receive a supply of tubular pieces 100 which, in the illustrated embodiment, are shown in Fig. 7 as being of the wire coil insert type provided with a tang 101. Bracket 47 is an inward extension of the flange 36, whereas bracket 48 extends forward of the plate 17 so that above bracket 48 there is a space 49 through which the trough 45 can be charged with the insert coils. The trough has a rounded bottom and is approximately V-shaped in cross-section as clearly shown in Fig. 3. This shape tends to direct the inserts at the bottom of the trough approximately parallel with the plane of the disc 21 so that an arm 41 with its end 44 can pick up an insert coil while passing through the trough. Of course, if the opening at one end of the inserts is obstructed, e.g. by a tang, the arms can pick up the inserts only by their open ends.

As it happens that a picked-up tubular piece is not properly positioned on the end 44 of an arm, means are provided to straighten the piece on the arm. For this purpose, another bracket 50 is provided which extends from the frame plate 17 inward above the charging space 49. As clearly shown in Fig. 5, a holding piece 51 is secured to the bracket by screws 52. Two leaf springs 53 and 54 are fastened with their foot ends by screws 55 to the opposite ends of the piece 51 from which they extend a substantial distance parallel to each other. Their free ends 56 and 57 are bent at right angles towards each other so as to leave only a narrow slit therebetween. On rotation, the arms of the wheel pass through between the springs 53 and 54, as e.g., the arm 411 which urges a tubular piece 100 thereon against the spring ends 56 and 57 to spread them apart as shown in dotted lines. The resistance to the spring deformation will tend to seat the piece properly on the end 44 of the arm 411.

Notwithstanding the effect of the springs 53 and 54 it may happen that one tubular piece is properly positioned on an arm but another one is entangled with it. Means are provided to remove such entangled piece. This is accomplished according to the invention by means of a rotating blade 60 which passes in close proximity to the end of an arm in the position 412. Blade 60 is clamped to a shaft 61 which is journaled with a sleeve 62 in the upper portion of the frame plate 17, as clearly shown in Fig. 3. A lubricating means for the shaft is indicated at 63. The shaft extends rearward of the plate 17 and carries secured thereto a small sprocket wheel 64 connected with the aforementioned sprocket wheel by means of a timing belt 65. The transmission between the wheels 30 and 64 is so selected that shaft 61 with blade 60 completes one revolution while the wheel 21 turns through 30°, i.e. 360° divided by the number of arms 41, and the blade 60 is so adjusted on the shaft 61 that it just clears the path of an approaching arm 41.

A chute is provided to receive the picked up tubular pieces and to convey them to a place of use. The chute comprises a tube, in general denoted by 70, which in its upper portion 71 is curved according to a circle of a radious equal to that of the arm ends 44. It is of a width slightly larger than the outer diameter of a tubular piece 100 for which the device is destined, and it is slotted at its inner portion at 72 so that the arm portions 44, with tubular pieces thereon, can move interiorly of the tube portion 71. The end 73 of the tube is located at a short distance from the assembly of the blade 60 in the direction of the rotation of wheel 21 and is flared to facilitate the entrance of an arm at 413. Approximately 60° downward from the vertical diameter of the wheel a portion 74 of the tube 70 is directed downward and tangential with respect to the arcuate portion 71. In this tangential portion 74 the paths of the pieces 100 and of arm ends 44 separate. The pieces 100 will drop from the arm ends and continue to move through the chute, whereas the arm ends 44 have to travel on their circular path downward so as to re-enter the trough 45. Obviously the arm ends 44 are free to leave the chute through the slot 72 provided these ends are exactly in a plane with that slot. However, it may happen that the one or the other arm end 44 is bent slightly out of that plane. It also may happen that a piece 100 does not fall freely from an arm end 44 if it has been distorted or otherwise damaged as a result of continuous handling through the mechanism. In such an event, the path of the arm would be obstructed by the wall of the chute. For this reason, means are provided to render the desired movement of the arm ends 44 possible regardless whether or not they are located exactly in the mentioned plane and whether or not a piece 100 still clings to an arm end leaving the chute. For this purpose and as clearly shown in Fig. 4, the inner half of the tube is cut away in the portion 74 so that only the outer half 75 remains. This outer half of the tube is embedded in a V-shaped recess 76 in the edge of a flat piece 77 which is secured to the flange 36 by screws 78. Two leaf springs 79 and 80 are fastened with their foot ends by screws 81 to the sides of the piece 77. The free ends of the springs are curved towards each other so that they enclose together with the outer half 78 of the tube a cross-section of substantially the same diameter as the inner diameter of the tube 70. The springs, as clearly shown in Fig. 1, are so wide that they extend approximately from the point where the tangential tube portion 74 begins to the point where the path of the arms 41, which enter and may spread the leafs apart, continues outside the tube 70. Thus the illustrated spring arrangement permits an arm end 44 to leave the chute 70 on its circular path even if it is somewhat out of line or still carries a tubular piece which did not drop off it in the proper manner.

Below the springs 79 and 80 the tangential tube portion 74 is continued a short distance as a complete tube to approximately the horizontal center plane of the wheel. At this point it is held in position by a flange-like plate 82 which bears on a bracket 83 projecting from the frame flange 36. Underneath bracket 83, a portion 84 of the tube is bent downward and continued by a substantially vertical end or discharge portion 85. The lower end of the portion 84 has a flange 86 which is carried by the aforementioned bracket 47. Both the brackets 83 and 47 are provided with holes 87 and 88, respectively, through which the tube portion 84 extends. In this portion 84, half of the circumference of the tube is cut away on the side facing the wheel 21 over a length somewhat more than that of one of the tubular pieces 100. The recess 89 thus created constitutes an overflow outlet through which tubular pieces guided by bracket 47 can fall back into the trough 45 when the discharge tube portion 85 is filled up, which may occur when the tubular pieces are not removed from the end of the tube portion 85 as fast as they are supplied by the arms 41. The length of the recess opening 89 has a certain relationship to the length of the pieces passing the chute. Obviously, the recess must be greater than one times the length of the piece to permit a piece to fall out. On the other hand, if the opening is too great, then the piece must travel an excessive distance to bridge the recess. The piece has a tendency to fall out rather than continue along the path of the tube since it behaves as a freely falling body. We have found that about twice the length of the piece is most satisfactory. In such a case even if the piece 100 is stacked vertically ¾ of its length above the lower portion of the recess, the next piece will have an opportunity to fall out. The tube portion 85 may be extended as desired and connected to a suitable machine, magazine or the like.

On the side of the device opposite the chute portion 84, a hopper 90 may be attached in communication with the space 49 for charging the trough with a supply of pieces 100. The front of the device may be closed by a cover plate 91 which bears on the outer upper rim 92 of the trough 45 and is secured to the flange 36 by screws 93.

The device operates in the following manner:

After filling the trough 45 with tubular pieces 100 through hopper 90, the motor 14 will be started to rotate the wheel 21 as hereinbefore described. Each arm 41, passing through the trough 45, will pick up one of the pieces 100 when the free ends 44 engage the interior of the latter. An arm so loaded enters between the springs 53, 54, the ends 56, 57, of which will straighten the piece 100 on the end 44 of the arm as hereinbefore described. Thereupon the arm passes the blade 60 which will disentangle and remove any other tubular piece which might cling to the properly picked up and straightened piece 100. This piece is carried on into the tube 70 and through the tube portion 71. At the position of the arm 415, the tube or chute portion 74 is already so steep that the piece 100 slides off the arm end 44 which it precedes on its way through the springs 79 and 80. These springs may be spread apart by the more slowly moving arm from which the piece 100 has dropped so that the arm can leave the chute and continue its way to the trough 45 in order to repeat its operation. In the meantime, the piece 100 will have slid down through the portion 84 into the chute portion 85 provided the latter is not filled, in which event, the piece will drop through the opening 89 back into the trough 45.

Means 50 to 57 have been described which serve the purpose of properly positioning a picked-up tubular piece on an arm end 44. Another means serving the same purpose and which may be substituted for the parts 50 to 57 is shown in Fig. 8. It essentially comprises a flat strip 154 of a resilient material such as rubber, which is secured by a screw or screws 155, to a bracket 150 in the place where in Fig. 1 bracket 50 is located. The strip 154 extends in an inclined position so that it bears on a piece 100 in the position 411 of an arm portion 43. It will be clear that when the arm rotates in the direction of the arrow a, the resilient strip 154 will tend to retain the piece 100 so as to shift it back on the arm end 44 as far as possible.

Another modification may be used instead of the blade 60 hereinbefore described. The blade 60 functions satisfactorily in practically all instances where the tubular articles picked up are more or less rigid pieces, i.e. short lengths of a tube. The blade will then knock off the second one of the two coherent pieces while leaving the first one on the arm end 44. In the event, however, the tubular pieces are wire coils as shown in Fig. 7, it happens that two pieces are interlocked and the blade cannot separate the one from the other. As such interlocked or entangled pieces cannot enter the chute 71, they must be removed from the pick-up arm 43. For this purpose, another blade 160 may be used as illustrated in Figs. 9 and 10. This blade, 160, secured with one edge to the shaft 61 in the place of the blade 60, has an approximately oval hole 162 from which a slot 163 extends to the free edge 164 opposite the shaft. The hole has a minor width, parallel to the shaft 61, only little larger than the outer diameter of a piece 100, whereas the slot 163 is a little wider than the thickness of the arm portion 43. The shaft 61 rotates in the direction of the arrow c when the arm 41 rotates in the direction a. The timing and speed of rotation of the shaft 61 is such that shortly before the position of Fig. 9 is reached, the blade with its hole 162 comes into registry with the rear end of the piece 100, i.e. the right hand end in Fig. 9, and then passes the arm 43 with the slot 163. Shortly after the illustrated position the blade 160 will have passed the piece 100 entirely. If, at that time, another piece 100 should be entangled with that one which is properly located on the arm 43, either the second piece will be removed by the blade if both pieces hang only loosely together, or both pieces will be stripped from the arm if they cannot be separated by the blade 160. The mentioned relative movement renders it necessary that the length of the hole 162, at right angles to the shaft 61, is larger than the width. The correct dimensions can be easily found by trial or graphic determination.

It has been stated that tubular pieces which are obstructed at one of their ends will be picked up by the arm portion 44 only from their opposite open ends. Thus in the case, e.g., of screw thread insert coils 100 having a diametrical tang 101 at one end, as shown in Fig. 7, the coils will be carried by the arms 41 so that the tang provided ends are leading when the wheel 21 rotates. Consequently, the coils will drop through the chute portion 85 in such positions that the tangs are at the lower coil ends, and will be delivered in such positions to a connected machine or the like. In many instances, however, it will be necessary to supply the coils with the tangs in the reversed position. The same may be the case with respect to any other kind of tubular pieces with one obstructed end. Therefore, a modification is shown in Fig. 11 wherein means are provided to reverse the position of the pieces supplied by the arms of the wheel 21.

In this modification, the assembly of the wheel 21 with its arms 41 and its drive is similar to that hereinbefore described with reference to Figs. 1 to 5. Also the flange 136 is similar to the flange 36 except that the bracket 147, found on the left hand side of the flange 136, is formed horizontal rather than inclined as the bracket 47. This has been done in order to provide sufficient space for the reversing mechanism 120 which is combined with the chute 170. Whereas the latter, in its portions 171 and 174, corresponds to the portions 71 and 74, respectively, the portion 174 is continued by a wheel housing 121 in which a shaft 122 is journaled by means not shown. A wheel 123 is keyed to the shaft. It is provided with a number of blades 124 so shaped as to leave, between each two adjacent blades, a space 125 of sufficient size to receive therein a tubular piece which had first been picked up by one of the arms 41. The periphery of the housing is recessed at 126 adjacent the chute portion 174, the end of which is also recessed on its upper side at 127. The housing 121 is carried by the bracket 147 and is continued by the funnel-shaped upper end 128 of the exit portion 129 of the chute 170. A driving connection such as a timing belt indicated at 130 is provided between the wheel 123 and an enlarged hub 131 of the wheel 21. If, as in the case of the illustrated embodiment, the wheel 21 has twelve arms and the wheel 123 has eight blades, the transmission ratio should be 3:2 so that a space 125 forms a continuation of the tube 174 when a tubular piece released from arm 41 in the position 414 comes down the chute portion 174. Thus when the wheel 123 rotates in the direction of the arrow b, a released piece 100 will drop into a recess 125 which at that time is in registry with the end of the tube portion 174. The recess 127 permits the piece 100 to slide down to the bottom of the recess 125 notwithstanding the continued rotation of the wheel 123. In Fig. 11 a piece 100 is shown dropped from the end of tube portion 174 into the adjacent recess 125. During the rotation of the wheel 123, the piece 100 will be taken along until the recess 125 it engages comes into registry with the funnel 128. Owing to the turning of the wheel, the position of the piece will have been reversed so that the tang 101, which was at the lower end of the piece 100 when the latter entered the recess 125, now is at the top end when the piece is about to drop from the wheel recess into the funnel 128. This is shown by the piece 100' with tang 101'. The funnel-shaped opening of the chute portion 129 is so shaped that the piece 100', during the rotation of the wheel, has sufficient time to drop out of the engaged wheel recess 125 and to enter the chute portion 129.

It will be noticed that the housing periphery 121 is further recessed at 132 rearward of the funnel 128 in the direction of rotation of the wheel 123. This renders it possible for a piece taken along, to be dropped back into the trough 45 if the funnel entrance should be blocked by a piece which did not properly slide down the chute 129. Furthermore, an overflow opening is provided for the same purpose as that described with respect to the opening 89 in Fig. 3. This overflow opening 135 is located inside a container 136 which has a hole 137 in its bottom 138 through which the chute 129 extends. It is advisable to incline the chute portion 129 with recess 135 as shown in the drawing in order to urge the pieces 100 accumulated in the chute 129 to fall out of the recess. The lower mouth of the recess may be widened as shown at 135' to ensure, on the other hand, that the pieces 100 proceed properly in the chute 129 if the way down is unobstructed. Thus, the overflow pieces will collect in the container 136 from which they may be returned to the trough 45.

It will be clear that the chute 70 of Fig. 3 and the chute 170 with accessorial parts can be made interchangeable in a device according to the invention so that the tubular pieces can be delivered with a selected end up or down, as the further handling of the pieces may require.

It will be apparent to those skilled in the art that many alterations and modifications of the structure shown and described may be made without departure from the essence and spirit of the invention which for that reason shall not be limited but by the scope of the appended claims.

We claim:

1. In a device of the kind described, the combination of a wheel unidirectionally rotatable about a horizontal axis, said wheel including a plurality of spoke-like arms, each arm having a free outer end bent tangentially in the direction of the wheel rotation, a trough to receive therein a supply of tubular pieces of equal shape and dimensions, said trough being so located in relation to said axis that, upon rotation of said wheel, said arm ends of a lower wheel sector pass lengthwise through said trough to pick up each a suitably positioned one of said pieces, and a tubular chute in the plane of said arms and including a first portion bent according to an arc of a circle on which said arm ends travel, and extending from a first point in the upper circle sector in the direction of the wheel rotation to a second point located at a lower level, and a second portion tangential to said circle at said second point, said chute having an inner cross-section of a size through which said tubular pieces can pass, the wall of said first and said second portion facing said axis being provided with a longitudinal slot along which said arm ends with the adjacent arm portions can pass, an element between said trough and said first point, said element being movable across the path of said arm ends, and a drive to move said element in synchronism with the rotation of said wheel to cross said path in timed relation to an approaching arm end so as to remove any tubular pieces which might be entangled with one properly seated on said approaching arm end.

2. In a device of the kind described, the combination of a wheel unidirectionally rotatable about a horizontal axis, said wheel including a plurality of spoke-like arms, each arm having a free outer end bent tangentially in the direction of the wheel rotation, a trough to receive therein a supply of tubular pieces of equal shape and dimensions, said trough being so located in relation to said axis that, upon rotation of said wheel, said arm ends of a lower wheel sector pass lengthwise through said trough to pick up each a suitably positioned one of said pieces, and a tubular chute in the plane of said arms and including a first portion bent according to an arc of a circle on which said arm ends travel, and extending from a first point in the upper circle sector in the direction of the wheel rotation to a second point located at a lower level, and a second portion tangential to said circle at said second point, said chute having an inner cross-section of a size through which said tubular pieces can pass, the wall of said first and said second portion facing said axis being provided with a longitudinal slot along which said arm ends with the adjacent arm portions can pass, a shaft located between said trough and said first point and being parallel to the axis of said wheel, a blade secured to and radially projecting from said shaft, and a drive for said shaft, said shaft being so located and said drive being so synchronized with the rotation of said wheel that said blade crosses the path of said arm ends immediately in front of each approaching arm end.

3. A device as claimed in claim 2, a portion of the path of said blade being directed approximately parallel to a small portion of the path of said arm ends before reaching said chute, said drive for said blade being so synchronized with said wheel that said blade moves on said portion of its path each time one of said arm ends moves on said small portion of its path, the speed of said blade being higher than that of said arm ends, and said blade being provided with an opening for the passage therethrough of one of said pieces on one of said arm ends so that when passing an arm end, said blade closely clears one of said pieces properly located on said arm end, and projects from said piece so as to strip any entangled piece from said arm end.

4. A device as claimed in claim 2, said blade, during a portion of revolution of said shaft, projecting into the path of said arm ends before the latter reach said chute, said blade being provided with a substantially oval hole having its largest dimension at right angles to said shaft and its width slightly larger than the outer diameter of one of said pieces, and with a slot extending from said hole to the edge of said blade opposite said shaft and being slightly wider than an arm portion adjacent an arm end, said drive being so synchronized with the rotation of said wheel that said blade passes each arm while clearing, with said hole, said arm end with one of said pieces properly positioned thereon, and with said slot, the arm portion adjacent said arm end.

5. A device as claimed in claim 1, said second chute portion having resilient walls so as to permit a spreading of said slot.

6. A device as claimed in claim 1, said second chute portion comprising a portion of said chute tube of which the one half facing the wheel is removed, a flat stationary element having an edge lengthwise grooved wherein the other half of said tube portion is embedded, and two flat springs secured to the sides of said element, said springs being so bent as to form together with said grooved edge said tangentially directed chute portion.

7. A device as claimed in claim 1, further comprising a third and a fourth chute portion in continuation of said second portion, said third portion being steeply inclined and away from said wheel, half of the wall circumference of said third portion facing said wheel being removed so as to form an overflow opening when said fourth portion is obstructed, the other half of said wall circumferenece constituting a guide for pieces sliding down from said second to said fourth portion.

References Cited in the file of this patent

UNITED STATES PATENTS

| | | | |
|---|---|---|---|
| 145,755 | Putnam | Dec. 23, | 1873 |
| 319,507 | Richards | June 9, | 1885 |
| 1,325,752 | Pope | Dec. 23, | 1919 |
| 1,432,747 | Eggert | Oct. 24, | 1922 |
| 1,646,571 | Avis | Oct. 25, | 1927 |
| 2,264,105 | White | Nov. 25, | 1941 |
| 2,543,244 | Klooz et al. | Feb. 27, | 1951 |
| 2,578,217 | Anderson | Dec. 11, | 1951 |

FOREIGN PATENTS

| | | | |
|---|---|---|---|
| 599,375 | Germany | Sept. 19, | 1932 |